Nov. 2, 1948.  F. E. DULMAGE  2,453,088

MIXING TORPEDO FOR PLASTICS EXTRUDERS

Filed Dec. 26, 1945

INVENTOR.
Frederick E. Dulmage
BY
Griswold & Burdick
ATTORNEYS

Patented Nov. 2, 1948

2,453,088

UNITED STATES PATENT OFFICE 2,453,088

MIXING TORPEDO FOR PLASTICS EXTRUDERS

Frederick E. Dulmage, Saginaw, Mich., assignor to The Dow Chemical Company, Midland, Mich., a corporation of Delaware Application December 26, 1945, Serial No. 637,274

3 Claims. (Cl. 18—12)

This invention relates to an improved torpedo for plastics extrusion machines, and particularly to a plasticating, mixing and homogenizing device for use in such extruders.

Various means have been used to blend organic thermoplastics with such modifying materials as plasticizers, lubricants, pigments or dyes, and the like. This has often required the use of a plurality of machines such as dry mixers, compounding rolls, various types of kneaders or masticators, and other diverse machines. This is costly, time consuming, and each handling of the material increases the chances of contamination. To overcome this problem, various attempts have been made to effect the mixing and homogenizing in the extrusion device itself. Since most such machines are worm-fed, and since a feed worm is fundamentally inefficient as a mixer, the suggestions have usually involved complex baffling attachments to create turbulence and mixing where none normally occurs. These devices create inordinately large back pressures, and uneconomical amounts of work are required to drive the worm. They do not avoid or overcome the common pulsations of a screw-fed extruder. Further, it has usually been necessary to put the extruded mix through the machine two or three times to effect the desired blending and to realize the uniformity previously obtained with compounding mills, and each pass through the extruder has had to be followed by a cutting, chopping or grinding step to give a suitable granular feed for the next pass. Such multiple-pass treatments may require the plastic, especially if heat-sensitive, to remain heated long enough to induce degradation or oxidative discoloration.

It is accordingly among the objects of the present invention to provide a means, operable in conjunction with an extrusion device, for blending a plastic mix to a state of homogeneity in a single pass through the extruder. A related object is to provide such a means which will not offer increased resistance to flow of material through the extruder, and hence, which will not increase the power requirements of the extruder. A further object is to provide a novel and efficient mixing torpedo, adapted to be used in standard plastics extrusion apparatus. Another object is the provision of such a mixing torpedo which can be used without changing the barrel of a standard extrusion machine and with only simple changes being required in the worm of such machine. An additional object is to modify a screw-fed extruder to avoid or overcome the usual surges and pulsations in the delivery rate of such machines. Further objects may appear as the description proceeds.

The foregoing and related objects have now been attained through the provision of a simple elongated cylindrical torpedo, adapted to be secured coaxially to the forward end of a shortened worm of an extruder and fitting rotatably within and occupying from about ¼ to about ½ the length of the cylindrical sleeve of the extruder, the torpedo having a plurality of equally spaced helical grooves with rounded bottoms in its cylindrical surface, said grooves having the same hand as the feed worm and having a lead of from ½ to 2 times the length of the torpedo, there being also provided a plurality of spaced neck-like circumferential constrictions along the torpedo, of the same depth as the said helical grooves, the constrictions representing abrupt decreases in diameter of the torpedo at their feed ends and gradual returns to the original diameter at their discharge or forward ends, the combined capacities of the helical grooves and circumferential constrictions being at least as great as the delivery capacity of the said coaxial feed worm.

The invention will be illustrated with reference to the accompanying drawing, wherein Fig. 1 is a longitudinal section through part of the barrel of a standard plastics extruder, showing a feed worm and the new torpedo in elevation;

Figure 1:
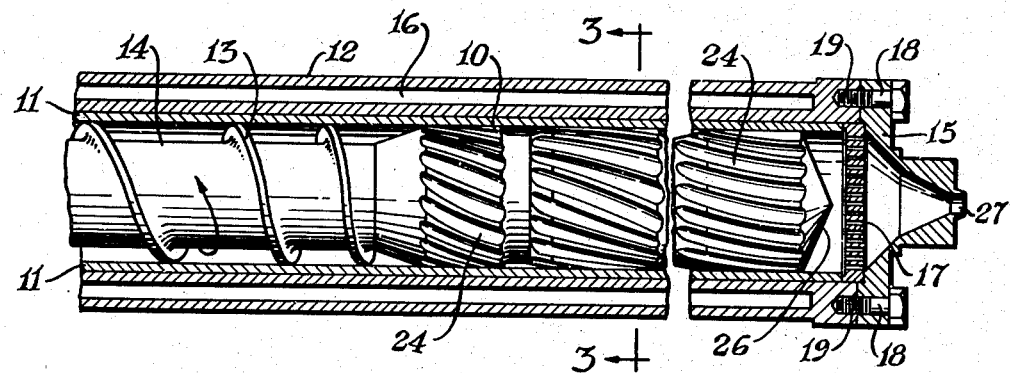

The torpedo 10 of the present invention is used in the cylindrical barrel 11 of a standard, usually horizontal, extrusion machine 12, and is a coaxial extension of a shortened feed screw 13 of conventional type. Screw 13 usually, but not necessarily, has a root 14 at least half the diameter of barrel 11, and is ordinarily of the compression type, with a diminishing lead on successive flights of the screw. Torpedo 10 is suitably from one-quarter to one-half the length of the extruder barrel 11, from the hopper (not shown) to the head 15. Typically, the barrel 11 is surrounded by chamber 16, for heating or cooling, as required. Beyond torpedo 10, in the extrusion path, is a screen or strainer 17, held in place across the discharge end of barrel 11 by head 15, which is secured to the body of extruder 12 by means of bolts which may be inserted or withdrawn through bolt holes 18 and tapped sockets 19. Head 15 may be of any desired form, and may be straight (as shown) or of the goose-neck or L varieties. Any desired type of extrusion orifice 27 or orifices may be used.

Figure 2:
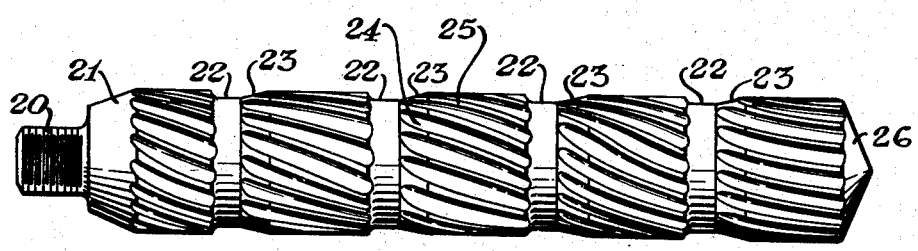
Fig. 2 is an enlarged elevation of the torpedo.
Figure 3:
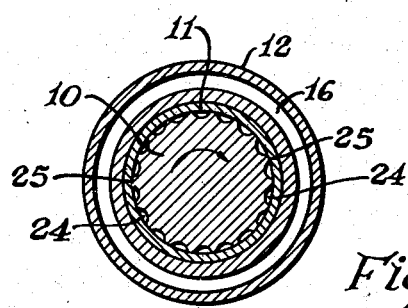
Fig. 3 is a cross-sectional view of the torpedo and the extruder barrel taken along line 3—3 of Fig. 1.

The essential feature of the invention is the torpedo 10, which is shown in one typical conformation in Fig. 2. The body of torpedo 10 is of a diameter enough smaller than the bore of barrel 11 to leave a clearance of 0.010 to 0.020 inch between the two members. This clearance should ordinarily be great enough to admit a lubricating film of plastic between the torpedo 10 and the barrel 11, but should be insufficient to admit a film of plastic so thick that relative motion between torpedo 10 and barrel 11 will result in a shearing of that film rather than the preferred continuous exchange between the film and the larger plastic masses being conveyed through the machine. A stud 20, coaxial with the torpedo 10, of a diameter less than that of the root 14 of screw 13, is threaded of the same hand as the direction of rotation of the screw 13 and torpedo 10, so as to maintain a tight coupling between the two when said stud is turned into a socket (not shown) provided for that purpose in the forward end of the shortened screw 13. A tapered circumferential shoulder 21 is provided between the torpedo body and the root 14 of screw 13, to furnish a smooth approach over which plastic material may be forwarded as it leaves the screw. At least one, and usually from three to five, circumferential necks 22 are provided at regularly spaced intervals along torpedo 10, and each neck 22 adjoins a tapered shoulder 23 at its forward or delivery end to furnish a smooth and gentle return from the lesser diameter of neck 22 to the greater body diameter of torpedo 10. For most efficient operation, the angle of taper is between about 12° and 20°, though angles as high as 30° may be used. Conveniently, the necks 22 and shoulders 23 are of about the same lengths, and together their lengths are about two-thirds the length of the torpedo body 10 lying between one shoulder 23 and the next succeeding neck 22. Disposed helically about the torpedo 10 is a series of rounded grooves 24, of a depth equal to the distance necks 22 are set back from the surface of body 10. Grooves 24 thus furnish continuous smooth passageways from one neck 22 to the next. The right helicoid grooves 24 are of opposite hand to the rotation of the screw 13 and torpedo 10, i. e. they have the same hand as the flights of screw 13, and have a lead length which may vary from one-half to two times the length of the torpedo. In the modification illustrated, grooves 24 have a lead 1.5 times the length of torpedo 10.

As a specific illustration, a nominal 4.5-inch plastics extruder had a barrel and screw 4.5 feet long. The screw was cut to a 2.5-foot length and was coaxially drilled and tapped to receive the 2-inch diameter left hand-threaded stud 20 of the 24-inch long torpedo 10 shown in Fig. 2. Shoulder 21 had a 22½° slope. The clearance between torpedo 10 and barrel 11 was 0.015 inch. The torpedo 10 had 18 right hand helical grooves, each having a 0.3125 inch radius and 0.25 inch depth, with a 36 inch lead. The lands 25 between grooves 24 were about 0.125 inch wide. There were four necks 22, each 0.5 inch less in diameter than torpedo 10, and each 0.9375 inch long. Each neck adjoined, at its discharge end, a tapered (about 15°) shoulder 23 also 0.9375 inch long. The distance from the end of one shoulder 23 to the next neck 22 was 2.875 inches. The torpedo was given an over-all smooth finish. A similar 6-inch extruder was fitted with a torpedo 10 which was 2.5 feet long, had 5 necks only slightly longer than the ones above described (1.125 inch) and had 24 equally spaced grooves with a radius of 0.3125 inch, a depth of 0.25 inch, and a lead of 48 inches. The depth of the grooves never exceeds their radius, for preferred operation. As in the examples, it is preferred that, of the original circumference of the torpedo blank, not over one-third, and usually less than one-fourth, remains as lands, while at least two-thirds, and usually over three-fourths, is occupied by grooves.

In operation, the extruder 12 is heated by steam in chamber 16 and the desired ingredients of the final mix are fed to screw 13, suitably from or through a hopper (not shown). The screw 13 and its coaxial extension, torpedo 10, are set in motion by a motor-driven gear (not illustrated) in the conventional manner. In the illustrated modifications, rotation is to the left, since screw 13 and grooves 24 are both right handed. Initial fusion and preliminary, non-uniform mixing occurs as the feed is advanced by the screw toward the torpedo. When the feed reaches the torpedo it is advanced outwardly over shoulder 21 to the entrances to grooves 24, among which it is evenly distributed. Examination has shown that continued rotation of torpedo 10, when grooves 24 are filled with plastic, results in unique agitation of the mass. Apparently, friction between the barrel 11 and the plastic in grooves 24 causes that plastic to roll within the groove, both axially of the groove, with a rightward rotation, and forwardly along the groove. The mass in each groove becomes thoroughly mixed. There is continuous exchange between the rotating mass of plastic in the grooves and that which forms the film between the lands and the barrel. This appears to occur as the lands scrape plastic from the barrel, at the same time losing a like amount to that part of the barrel which was just scraped by the adjacent land. Then, as the several grooves 24 discharge their loads into the pockets between necks 22 and barrel 11 a further mixing and homogenizing action occurs. There is at this point a tendency for the mass to form a collar or series of collars about neck 22. This tendency is continuously interrupted by the further discharge of numerous streams of fresh plastic from the helical grooves. These streams perforate and rupture the collar-like rings of material around the neck 22, mingling therewith, and their entry forces a like amount of material forward into the next set of groove segments, where the process is repeated, and further mixing occurs. When the plastic streams are finally discharged beyond torpedo head 26, their continued left-hand mass revolution and right-hand individual rotation causes further mixing. The mass is then displaced forwardly through screen 17 and thence out through extrusion head 15 and its orifice 27. Extrusion occurs substantially without pulsation. Thereafter the extruded material is handled in the usual manner.

In practice, the 4.5-inch extruder, as modified above, has been used for plasticating and color blending ethyl cellulose plastics and has delivered perfectly uniform material from the orifice at rates ranging from 200 to 300 pounds an hour. A single pass through the extruder has effected the amount of mixing (judging by the uniformity of the product) previously obtained from a 20-minute mastication on compounding rolls, followed by sheeting, cooling and comminution of the sheet, extrusion of the comminuted product through a standard screw extruder, a second comminution and a final re-extrusion. Thus, in a few minutes the present apparatus accomplishes results which have previously required as much as several hours. The machine operates with similar advantage on cellulose ester plastics, polystyrene, the other vinyl and acrylic polymers, vinylidene chloride copolymers, and rubber, and the like.

The power requirements of the modified apparatus here described, in operation, are not significantly different from those of a standard screw extruder, the same motor being able to drive the device without overloading. This is in contrast to the relatively high power requirements of various so-called mixing heads heretofore proposed for attachment to extruders.

Because of the high throughput capacity of the new modified extruders, the herein described torpedo may be found useful, even in those extrusions where mixing is not required, to function somewhat in the roll of a non-pulsating plastics pump.

Since the maximum thickness of plastic in the torpedo-filled section of the machine is slight as compared with the thicknesses usually encountered in screw extruders, a further advantage is found in the ease and rapidity with which the new modified machines may be put into operation, even when they have been allowed to stand with a charge of plastic "frozen" in them. This condition is not encountered, under ordinary circumstances, however, since the new machine is almost self-cleansing.

I claim:

1. In an extruder, in combination with a screw for advancing plastic feed along a cylindrical barrel: a cylindrical mixing torpedo beyond the screw, coaxial and continuous therewith, rotatable within the barrel with a clearance therebetween of the order of 0.010 to 0.020 inch insufficient to admit a plastic layer which would shear under the tangential stress caused by rotation of the torpedo; a plurality of evenly spaced helically disposed grooves of constant radius running the length of said torpedo having the same hand as the said screw and a lead of from ½ to 2 times the length of the torpedo, the combined delivery capacities of the helical grooves being at least as great as the delivery capacity of the coaxial feed worm; and, at intervals along the torpedo, circumferentially disposed neck-like constrictions of a depth equal to that of the said helical grooves, being bevelled at their discharge ends from the lesser diameter of the necks to the greater diameter of the lands of the torpedo.

2. In an extruder, in combination with a screw for advancing plastic feed along a cylindrical barrel: a cylindrical mixing torpedo beyond the screw coaxial and continuous therewith, rotatable within the barrel with a clearance therebetween of the order of 0.010 to 0.020 inch insufficient to admit a plastic layer which would shear under the tangential stress caused by rotation of the torpedo; a plurality of evenly spaced helically disposed grooves of constant radius and nearly semi-circular cross section running the length of said torpedo, having the same hand as the said screw and a lead of from ½ to 2 times the length of the torpedo, the combined delivery capacities of the helical grooves being at least as great as the delivery capacity of the coaxial feed worm; and, at regular intervals along the torpedo, circumferentially disposed neck-like constrictions of a depth equal to that of the said helical grooves, being bevelled at an angle of about 12° to 20° at their discharge ends from the lesser diameter of the necks to the greater diameter of the lands of the torpedo, the necks and adjacent bevelled shoulders together being about ⅔ as long as the distance from the end of one such bevel to the next such neck.

3. In an extruder, in combination with a screw for advancing plastic feed along a cylindrical barrel: a cylindrical mixing torpedo beyond the screw, coaxial and continuous therewith, rotatable within the barrel with a clearance therebetween of the order of 0.010 to 0.020 inch insufficient to admit a plastic layer which would shear under the tangential stress caused by rotation of the torpedo; a plurality of evenly spaced helically disposed grooves of constant radius and nearly semi-circular cross section running the length of said torpedo, having the same hand as the said screw and a lead of about 1½ times the length of the torpedo, at least ⅔ of the cylindrical surface of the torpedo blank being occupied by said grooves, while not over ⅓ thereof remains as lands, the combined delivery capacities of the helical grooves being at least as great as the delivery capacity of the coaxial feed worm; and, at regular intervals along the torpedo, circumferentially disposed neck-like constrictions of a depth equal to that of the said helical grooves, being bevelled at an angle of about 12° to 20° at their discharge ends from the lesser diameter of the necks to the greater diameter of the lands of the torpedo, the necks and adjacent bevelled shoulders together being about ⅔ as long as the distance from the end of one such bevel to the next such neck.

FREDERICK E. DULMAGE.

REFERENCES CITED

The following references are of record in the file of this patent:

UNITED STATES PATENTS

| Number | Name | Date |
| --- | --- | --- |
| 1,403,681 | Gordon | Jan. 17, 1922 |
| 2,040,017 | Stoppel | May 5, 1936 |
| 2,286,405 | Gordon | June 16, 1942 |
| 2,370,952 | Gordon | Mar. 6, 1945 |